US007694759B2

(12) United States Patent
Frechet et al.

(10) Patent No.: US 7,694,759 B2
(45) Date of Patent: Apr. 13, 2010

(54) LIFT TRUCK FLEET WITH A COMMON FRAME

(75) Inventors: Olivier Frechet, Antran (FR); Eric Goguelet, Cenon-sur-Vienne (FR)

(73) Assignee: Linde Material Handling GmbH, Aschaffenburg (DE)

( * ) Notice: Subject to any disclaimer, the term of this patent is extended or adjusted under 35 U.S.C. 154(b) by 964 days.

(21) Appl. No.: 11/237,614

(22) Filed: Sep. 28, 2005

(65) Prior Publication Data

US 2006/0103128 A1 May 18, 2006

(30) Foreign Application Priority Data

Sep. 29, 2004 (DE) ....................... 10 2004 047 338

(51) Int. Cl.
*B62D 51/04* (2006.01)

(52) U.S. Cl. ..................... 180/19.1; 180/19.2; 280/32.7

(58) Field of Classification Search ................ 180/19.1, 180/19.2, 19.3; 280/32.7; 187/222
See application file for complete search history.

(56) References Cited

U.S. PATENT DOCUMENTS 3,485,314 A * 12/1969 Herr .......................... 180/19.1
4,645,264 A * 2/1987 Morrison ..................... 298/1 H
4,878,339 A * 11/1989 Marier et al. ................ 56/14.7
5,653,466 A * 8/1997 Berrios ........................ 280/760
5,697,623 A * 12/1997 Bermes et al. ............. 280/32.7
6,443,252 B1 * 9/2002 Andes ........................ 180/65.1
6,830,111 B2 * 12/2004 Page ........................... 172/42
7,314,116 B2 * 1/2008 David et al. ................. 187/231
2002/0060440 A1 * 5/2002 Storer ........................ 280/163
2002/0094263 A1 * 7/2002 Page .......................... 414/719

FOREIGN PATENT DOCUMENTS

| | | |
|---|---|---|
| DE | 101 59 565 A1 | 6/2003 |
| FR | 2822124 A1 | 9/2002 |
| FR | 2832992 A1 | 6/2003 |

* cited by examiner

*Primary Examiner*—Lesley Morris
*Assistant Examiner*—Marc A Scharich
(74) *Attorney, Agent, or Firm*—The Webb Law Firm

(57) ABSTRACT

A fleet of lift trucks includes a lift truck for walk-behind operation without a stand-on platform and a lift truck for stand-on operation with a stand-on platform. Each lift truck of the fleet of lift trucks has a vehicle frame, to which a traction unit, a lifting device, and, optionally, a stand-on platform can be fastened. At least one lift truck of the fleet of lift trucks without a stand-on platform and at least one lift truck of the fleet of lift trucks with a stand-on platform (6, 8) have the identical vehicle frame. Each vehicle frame also has fastening elements for the optional fastening of a housing wall (5), a folding stand-on platform (6), and/or a fixed stand-on platform (8).

13 Claims, 2 Drawing Sheets

LIFT TRUCK FLEET WITH A COMMON FRAME

CROSS-REFERENCE TO RELATED APPLICATION

This application claims priority to German Application No. 10 2004 047 338.2 filed Sep. 29, 2004, which is herein incorporated by reference in its entirety.

BACKGROUND OF THE INVENTION

1. Field of the Invention

This invention relates to a fleet of lift trucks having lift trucks for walk-behind operation without a stand-on platform and lift trucks for stand-on operation with a stand-on platform, wherein each lift truck of the fleet of lift trucks has a vehicle frame to which a traction drive unit, a steering device, a lifting device, and, optionally, a stand-on platform can be fastened.

2. Technical Considerations

Lift trucks of the types described above, with and without a driver's stand-on platform, are in the product lines of major manufacturers of industrial trucks and are frequently used by the manufacturers in their own production operations. As used herein, the various lift trucks built by a manufacturer with and without a stand-on platform are identified by the general term "fleet of lift trucks."

In walk-behind operation, the operator walks behind or next to the lift truck and controls the lift truck by means of a steering bar. Lift trucks that are designed exclusively for walk-behind operation are equipped with a steering bar and do not have a stand-on platform for the operator.

Stand-on operation means that during operation of the lift truck, the operator is on the lift truck, for example in a standing position on a stand-on platform. A steering bar or other suitable operating element can be provided to control a lift truck that has a stand-on platform.

Lift trucks that can be used optionally in stand-on operation or walk-behind operation generally have a stand-on platform that folds up and are generally equipped with a steering bar.

The various possible models of the above-mentioned lift trucks of a fleet of lift trucks place different requirements on the vehicle frame of the lift truck. On lift trucks with a stand-on platform for the driver, the weight that is exerted on the stand-on platform must be absorbed by the vehicle frame. Lift trucks that are designed for stand-on operation generally also have a higher maximum speed than walk-behind lift trucks, in which the maximum speed of travel may not exceed walking speed. Consequently, the dynamic load that is exerted on the vehicle frame during travel on stand-on lift trucks is greater than on walk-behind lift trucks. The higher speed of travel of the stand-on lift trucks also requires a more complex design of the drive system and of the chassis of the lift truck.

To meet these different requirements, it has long been conventional to manufacture the different lift trucks in a fleet of lift trucks with different vehicle frames. With regard to manufacturing, however, this approach requires the maintenance of an inventory of a large number and variety of components for the different lift trucks of the fleet of lift trucks.

Therefore, it is an object of the invention to provide a fleet of lift trucks that can be manufactured with a smaller number of different components than conventional lift trucks.

SUMMARY OF THE INVENTION

The invention provides that at least one lift truck of the fleet of lift trucks without a stand-on platform and at least one lift truck with a stand-on platform have the same vehicle frame. The vehicle frame is thereby designed and constructed so that it can be used in identical form for different lift trucks of the fleet of lift trucks. In particular, the same frame can be used both for the manufacture of lift trucks with and without a stand-on platform.

The fleet of lift trucks can include, in addition to one or more walk-behind lift trucks, one or more lift trucks that can be used optionally for stand-on and walk-behind operation that have a folding stand-on platform and one or more lift trucks that are designed exclusively for stand-on operation that have a fixed stand-on platform. The identical frame can be used unchanged, i.e., interchangeably, for the manufacture of these three models of lift truck.

In one advantageous configuration, each vehicle frame has a vertical rear wall plate oriented in the transverse direction of the vehicle frame. The rear wall plate extends from the right side to the left side of the lift truck and forms the boundary between the frame and a load-carrying section of the lift truck.

Each vehicle frame has at least one substantially vertically oriented reinforcement plate in the longitudinal direction of the vehicle frame. For example, two reinforcement plates can extend in the vertical direction from the top of the frame, where the rear wall plate is located, to the underside of the frame, where a stand-on platform can be fastened.

Each vehicle frame also has at least one mounting plate that is oriented substantially horizontally, on which at least one mounting for a drive unit can be located. The mounting plate also extends over the full width of the vehicle frame. If the mounting plate has a plurality of mountings for a drive unit, the drive unit (depending on the model of lift truck) can be fastened to the frame centrally or laterally, as required. The mounting plate can also have one or more mountings for non-driven pivoting rollers.

It is particularly appropriate if each vehicle frame has fastening elements for the optional fastening of a housing wall, a folding stand-on platform, and/or a fixed stand-on platform. The housing wall is thereby part of a walk-behind lift truck, and on lift trucks that are designed to be used for stand-on operation, is replaced by a corresponding stand-on platform. The housing wall or the corresponding stand-on platform is thereby fastened directly to the vehicle frame or by means of suitable intermediate pieces, which can also be formed by a side wall of the lift truck, for example.

BRIEF DESCRIPTION OF THE DRAWINGS

Additional advantages and details of the invention are explained in greater detail below with reference to the exemplary embodiments illustrated in the accompanying schematic drawings, in which like reference numbers identify like parts throughout.

DESCRIPTION OF THE PREFERRED EMBODIMENTS

Figure 1:
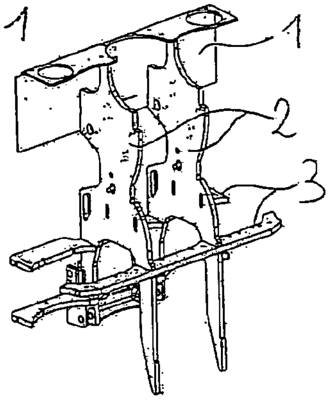
FIG. 1 shows a vehicle frame for use in a fleet of industrial trucks incorporating features of the invention.

FIG. 1 shows a vehicle frame for use in a fleet of industrial trucks incorporating features of the invention. The vehicle frame includes a rear wall plate 1, two reinforcement plates 2, and two mounting plates 3 that are located in the same plane. The vehicle frame is thereby designed and configured so that it can be used for different models of lift trucks of a fleet of lift trucks. In particular, both walk-behind lift trucks as well as stand-on lift trucks can be constructed using the identical vehicle frame.

Figure 2:
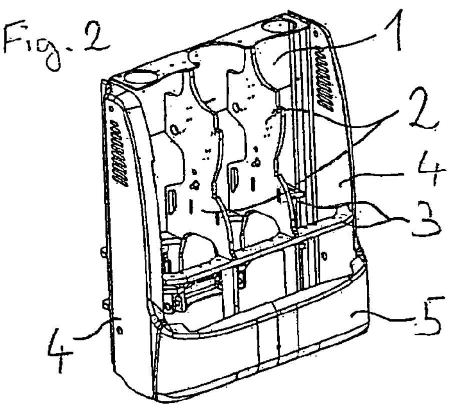
FIG. 2 shows a portion of a walk-behind lift truck of the invention.

FIG. 2 shows a portion of a walk-behind lift truck. The figure shows, in addition to the components of the vehicle frame, i.e., the rear wall plate 1, the reinforcement plates 2 and the mounting plates 3, lateral housing walls 4 and a front housing wall 5. The lateral housing walls 4 are fastened to the rear wall plate 1 and to the mounting plates 3. The front housing wall 5 is fastened to the reinforcement plates 2 and to the side housing walls 4.

Figure 3:
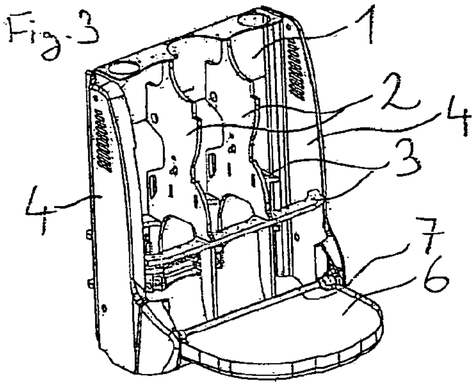
FIG. 3 shows a portion of a stand-on lift truck of the invention with a folding stand-on platform.

FIG. 3 shows a portion of a stand-on lift truck with a folding stand-on platform. In addition to the vehicle frame, the side housing walls 4 are realized so that they are identical to those shown in the walk-behind lift truck illustrated in FIG. 2. Instead of a front housing wall 5, a folding stand-on platform 6 for the operator of the lift truck is located on the front lower portion of the vehicle frame. In the folded-down position of the stand-on platform 6 shown in FIG. 2, the lift truck can be used in stand-on operation. If the stand-on platform 6 is folded up around an axis 7 into a vertical position, the lift truck can be operated in walk-behind operation.

Figure 4:
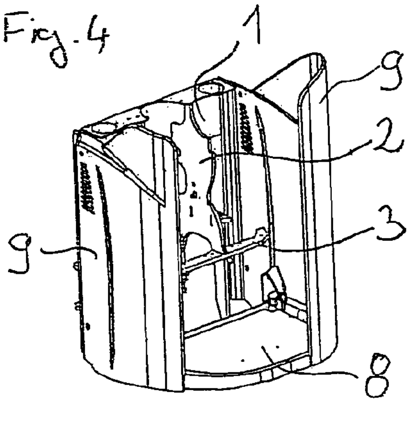
FIG. 4 shows a portion of a stand-on lift truck of the invention with a fixed stand-on platform.

FIG. 4 shows a portion of a stand-on lift truck that has a fixed stand-on platform 8. The vehicle frame with the rear wall plate 1, the reinforcement plates 2, and the mounting plates 3 is analogous to the vehicle frame illustrated in FIGS. 1-3. On this vehicle frame and on this lift truck are fastened a fixed, non-folding stand-on platform 8 and fixed side walls 9, which extend laterally from the vehicle frame into the vicinity of the stand-on platform 8.

The lift trucks illustrated in FIGS. 2-4 can all be components of a fleet of lift trucks that can be manufactured using an identical vehicle frame for use in a manufacturing plant for lift trucks. Consequently, in spite of a large number of different models within the fleet of lift trucks, the number of variants of the vehicle frame that have to be manufactured and maintained in inventory can be kept small.

Figure 6:
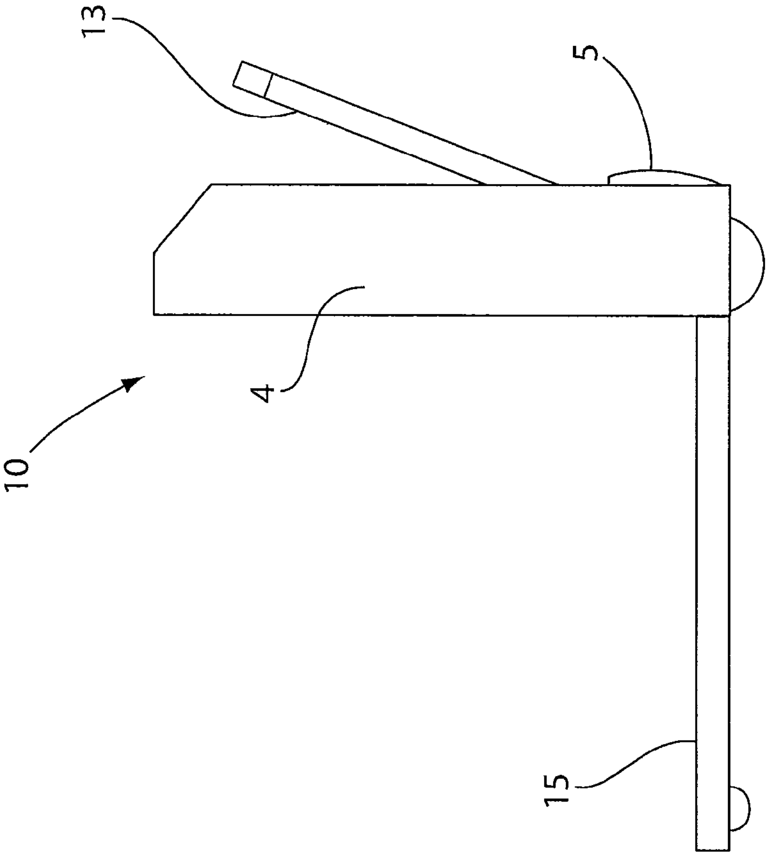
FIG. 6 shows a side view of the walk-behind lift truck shown in FIG. 5.
Figure 5:
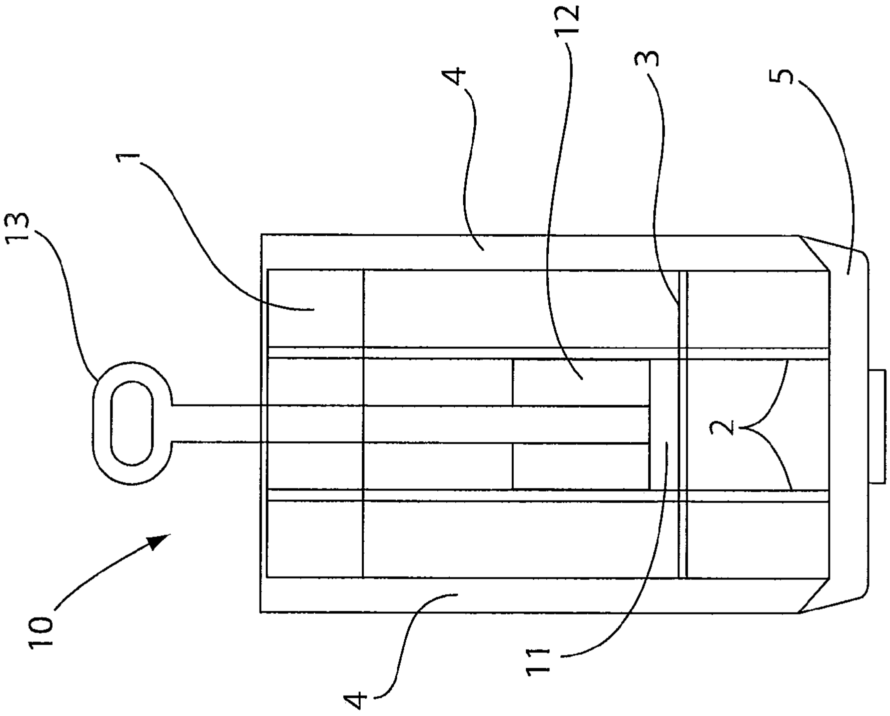
FIG. 5 shows a front view of a walk-behind lift truck of the invention.

FIGS. 5 and 6 show a walk-behind lift truck 10 incorporating a vehicle frame having a rear wall plate 1, reinforcement plates 2 and mounting plates 3 as discussed above with reference to FIGS. 1 and 2. Lateral housing walls 4 and a front housing wall 5 are fastened to the frame, as discussed above. The lift truck 10 further includes a drive unit 12, which may be of any type known to those having ordinary skill in the art, fastened to the mounting plates 3 by a mounting 11, which also may be of any type known to those having ordinary skill in the art. A steering device 13 is also fastened to the vehicle frame. A lifting device 15 is fastened to the rear side of the vehicle frame. It is to be appreciated by those having ordinary skill in the art that the vehicle body of the walk-behind lift truck 10 could be modified, to include, with reference to FIG. 3, a folding platform 6 to provide optional stand-on operation of the lift truck or to include, with reference to FIG. 4, a fixed platform 8 to provide permanent stand-on operation of the lift truck.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A lift truck, comprising:

a vehicle frame, to which a drive unit, a steering device, and a lifting device are fastened, the vehicle frame having left and right sides;

left and right vertically extending lateral walls attached to the left and right sides of the vehicle frame, respectively; and a front assembly operatively connected to the vehicle frame, the front assembly selected from the group consisting of: a front housing wall for walk-behind operation of the lift truck and a stand-on platform for stand-on operation of the lift truck, wherein the vehicle frame includes a rear wall plate that is oriented substantially vertically in a transverse direction of the vehicle frame, and wherein the vehicle frame further includes at least one reinforcement plate that is oriented substantially vertically in a longitudinal direction of the vehicle frame and, wherein the at least one reinforcement plate depends vertically from the rear wall plate.

2. The lift truck as claimed in claim 1, wherein the stand-on platform is hingedly connected to the left and right vertically extending lateral walls so as to be movable between a folded down position and a folded up position.

3. The lift truck as claimed in claim 1, wherein the stand-on platform is fixedly connected to the left and right vertically extending lateral walls.

4. The lift truck as claimed in claim 3, wherein the vertically extending lateral walls extend laterally from the vehicle frame into a vicinity of the stand-on platform.

5. The lift truck as claimed in claim 1, wherein the vehicle frame further includes at least one mounting plate that is oriented substantially horizontally and includes at least one mounting for the drive unit and, wherein the at least one mounting plate is attached to the at least one reinforcement plate and is disposed below the rear wall plate.

6. The lift truck as claimed in claim 5, wherein the left and right vertically extending lateral walls are fastened to the rear wall plate and the at least one mounting plate.

7. The lift truck as claimed in claim 1, wherein the front housing wall is connected to the vertically extending lateral walls.

8. A lift truck, comprising:

a vehicle frame, to which a drive unit, a steering device, and a lifting device are fastened, the vehicle frame having left and right sides;

left and right vertically extending lateral walls attached to the left and right sides of the vehicle frame, respectively; and a front assembly operatively connected to the vehicle frame, the front assembly selected from the group consisting of: a front housing wall for walk-behind operation of the lift truck and a stand-on platform for stand-on operation of the lift truck, wherein the vehicle frame includes a rear wall plate that is oriented substantially vertically in a transverse direction of the vehicle frame, and wherein the vehicle frame further includes at least one mounting plate that is oriented substantially horizontally and includes at least one mounting for the drive unit and, wherein the at least one mounting plate is disposed below the rear wall plate.

9. The lift truck as claimed in claim 8, wherein the vehicle frame includes at least one reinforcement plate that is oriented substantially vertically in a longitudinal direction of the vehicle frame.

10. The lift truck as claimed in claim 9, wherein the at least one reinforcement plate includes two reinforcement plates.

11. A lift truck, comprising:

a vehicle frame, to which a drive unit, a steering device, and a lifting device are fastened, the vehicle frame having left and right sides;

left and right vertically extending lateral walls attached to the left and right sides of the vehicle frame, respectively; and a front assembly operatively connected to the vehicle frame, the front assembly selected from the group consisting of: a front housing wall for walk-behind operation of the lift truck and a stand-on platform for stand-on operation of the lift truck, wherein the vehicle frame includes at least one mounting plate that is oriented substantially horizontally and includes at least one mounting for the drive unit, and wherein the at least one mounting plate includes two mounting plates located in the same plane.

12. The lift truck as claimed in claim 11, wherein the vehicle frame includes at least one reinforcement plate that is oriented substantially vertically in a longitudinal direction of the vehicle frame.

13. The lift truck as claimed in claim 12, wherein the at least one reinforcement plate includes two reinforcement plates.

* * * * *